United States Patent
Ulichney et al.

(10) Patent No.: US 10,223,800 B2
(45) Date of Patent: Mar. 5, 2019

(54) DETERMINE PRESENCE OF QUASI-PERIODIC TWO-DIMENSIONAL OBJECT

(71) Applicant: Hewlett-Packard Development Company, L.P., Fort Collins, CO (US)

(72) Inventors: Robert Ulichney, Stow, MA (US); Matthew D Gaubatz, Seattle, WA (US); Stephen Pollard, Dursley (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/300,074

(22) PCT Filed: Mar. 28, 2014

(86) PCT No.: PCT/US2014/032191
§ 371 (c)(1),
(2) Date: Sep. 28, 2016

(87) PCT Pub. No.: WO2015/147862
PCT Pub. Date: Oct. 1, 2015

(65) Prior Publication Data
US 2017/0132800 A1    May 11, 2017

(51) Int. Cl.
*G06T 7/42* (2017.01)
*G06K 9/52* (2006.01)
*G06T 7/11* (2017.01)
*G06K 9/62* (2006.01)

(52) U.S. Cl.
CPC ............... *G06T 7/42* (2017.01); *G06K 9/522* (2013.01); *G06K 9/6202* (2013.01); *G06T 7/11* (2017.01); *G06T 2207/20056* (2013.01)

(58) Field of Classification Search
CPC ................... G06K 9/6202; G06T 2207/20056
See application file for complete search history.

(56) References Cited

U.S. PATENT DOCUMENTS

| | | | |
|---|---|---|---|
| 6,718,047 B2 | 4/2004 | Rhoads |
| 7,049,608 B2 | 5/2006 | Yamaguchi et al. |
| 7,050,653 B2 | 5/2006 | Edso et al. |
| 7,418,125 B2 | 8/2008 | Miyashita |
| 7,599,517 B2 | 10/2009 | Kogure et al. |
| 8,532,365 B2 | 9/2013 | Tate |

(Continued)

FOREIGN PATENT DOCUMENTS

| WO | WO-2007109003 A2 | 9/2007 |
|---|---|---|
| WO | WO-2011126523 A1 | 10/2011 |

OTHER PUBLICATIONS

Anfinogenov. S, "Design of Digital Watermarking System Robust to the Number of Removal Attacks", Oct. 22, 2013.

*Primary Examiner* — Qian Yang
(74) *Attorney, Agent, or Firm* — HP Inc. Patent Department (57) ABSTRACT

Examples disclosed herein relate to determining the presence of quasi-periodic two-dimensional object. In one implementation, a processor determines peak points of a DFT of an image where the peak points are points with a value above a threshold relative to surrounding points. The processor may then output information indicating the existence of a quasi-periodic two-dimensional object within the image based on the peak points.

20 Claims, 5 Drawing Sheets

(56) References Cited

U.S. PATENT DOCUMENTS

| | | |
|---|---|---|
| 2005/0036613 A1 | 2/2005 | Zhou et al. |
| 2007/0192087 A1 | 8/2007 | Kim et al. |
| 2010/0155464 A1 | 6/2010 | Swayn et al. |
| 2015/0071490 A1* | 3/2015 | Fukata .............. G06K 9/00791 |
| | | 382/103 |

* cited by examiner

DETERMINE PRESENCE OF QUASI-PERIODIC TWO-DIMENSIONAL OBJECT

BACKGROUND

A data bearing image may be used to provide information, such as a two-dimensional object displayed on printed material or on a digital device. For example, a halftone with black and white dots in a pattern of an aesthetically pleasing object may provide information. The two-dimensional object may have a periodic-structure that provides information based on small changes in the periodic-structure. For example, information useful for security or anti-counterfeiting may be provided by the two-dimensional object.

BRIEF DESCRIPTION OF THE DRAWINGS

The drawings describe example embodiments. The following detailed description references the drawings, wherein.

DETAILED DESCRIPTION

Information may be represented in the structure of a quasi-periodic two-dimensional object, and the object may lack fiducials, such as those present for a QR code, to alert a user to the presence of the data and the position of the data. The quasi-periodic two-dimensional object may be a steganographic halftone ("stegatone") or grid code that includes data unreadable by the human eye. For example, the object may consist of an array of elements on a two-dimensional periodic structure. The array of elements may be positioned in a data-bearing or non-data-bearing pattern. For example, data may be encoded with small perturbations in the periodic structure, resulting in a quasi-periodic object, A processor may create a Discrete Fourier Transform ("DFT") of an image and analyze the DFT to determine whether a quasi-periodic two-dimensional object is present within the image. For example, the magnitude of the DFT of the image reveals the frequency content in the image with different values at different frequencies. Strong spikes in the DFT may correspond to the spatial frequency of the quasi-periodic structure. The processor may determine whether a quasi-periodic two-dimensional object is present in the image by analyzing the number, value, and/or position of the spikes in the DFT. In some implementations, the processor may analyze the DFT to determine additional information about the image and the quasi-periodic two-dimensional object, such as information related to the scale and orientation of the quasi-periodic two-dimensional object.

In some cases, it may be unknown whether an image includes a security mark (ex. a quasi-periodic two-dimensional object), and the image of the security mark may be captured in an unpredictable manner, such as where the quasi-periodic two-dimensional object's scale is unknown when a mobile handheld image capture occurs. The quality of the image may affect whether any data associated with the quasi-periodic two-dimensional object may be read. For example, the scale of the quasi-periodic two-dimensional object within the image or the focus of the image may affect the ability to interpret the quasi-periodic two-dimensional object. Analyzing a DFT of an image may be useful for indicating whether a quasi-periodic two-dimensional object is present within the image and information about the properties of the image and/or the quasi-periodic two-dimensional object. For example, the image may be analyzed for further processing if a quasi-periodic two-dimensional object is detected.

In one implementation, a processor analyzes a video image to determine if a quasi-periodic two-dimensional object is within the video image. The processor may cause the camera to capture a still image of the target if a quasi-periodic two-dimensional object is detected. The processor may take into account additional criteria to the detection, such as focus or scale, to determine whether to proceed with further analysis.

Figure 1:
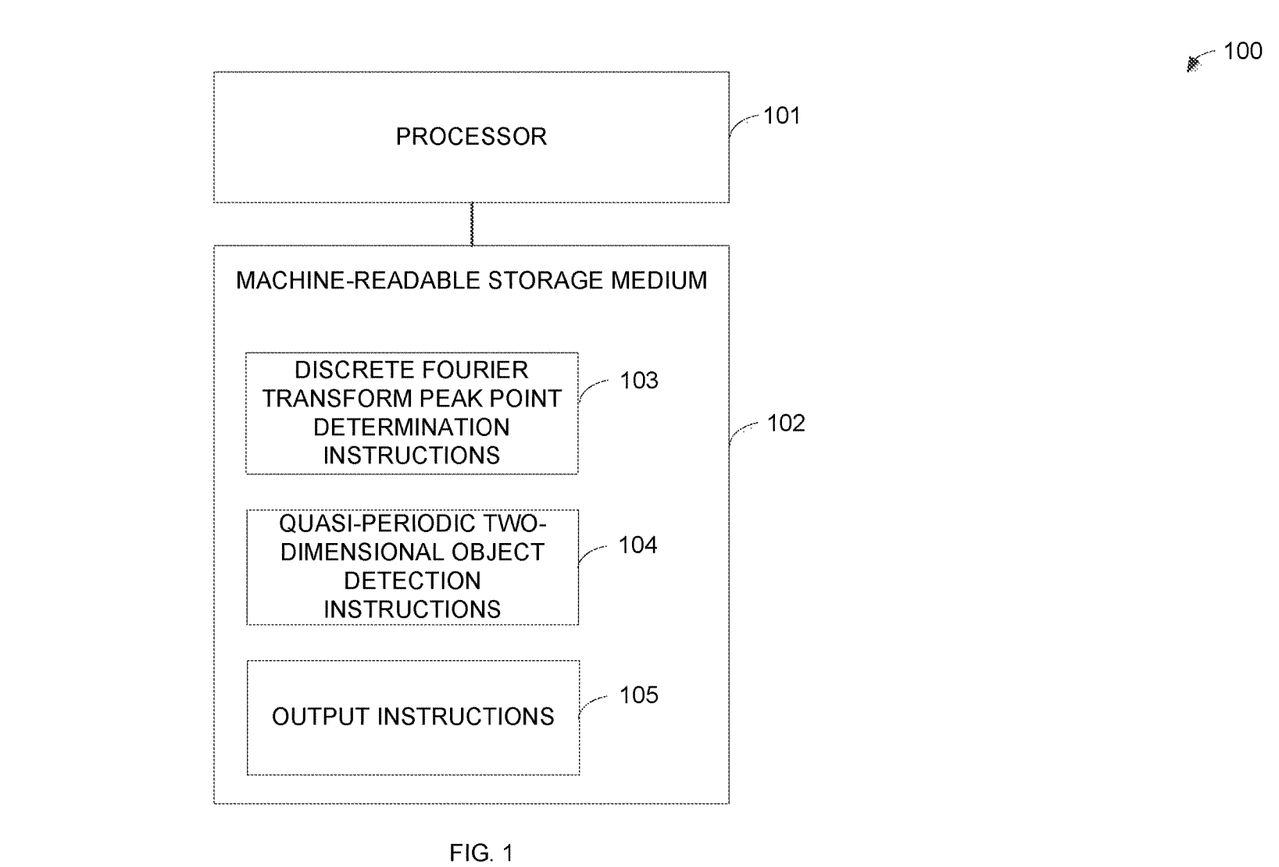
FIG. 1 is a block diagram illustrating one example of a computing system to detect a quasi-periodic two-dimensional object.

FIG. 1 is a block diagram illustrating one example of a computing system to detect a quasi-periodic two-dimensional object. For example, the computing system 100 may be associated with a mobile device for capturing a video or still image of a paper with a quasi-periodic two-dimensional object. The quasi-periodic two-dimensional object may be data bearing, such as a data bearing halftone (ex. stegatone) or grid code. The computing system 100 may include a processor 101 and a machine-readable storage medium 102.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include DFT peak point determination instructions 103, quasi-periodic two-dimensional object detection instructions 104, and output instructions 105.

The DFT peak point determination instructions 103 may include instructions to determine peak points of a DFT of an image, such as an image created by a camera or a scanner, with frequency values associated with peaks compared to surrounding areas. A peak point may be relative to a particular area. For example, there may be two peak points identified where one of the peak points has a greater value than the other. In one implementation, the half plane of the DFT is analyzed for peak points, and peak points in corresponding frequency ranges on a second half plane are assumed based on peak points within the analyzed half plane.

The quasi-periodic two-dimensional object detection instructions 104 include instructions to detect whether a quasi-periodic two-dimensional object exists within the image based on the number, value, and/or position of the determined peak points. For example, the processor 101 may determine if there are two peak points in the half plane to further analyze the relative position of the peak points. If the combination of two peak points relative to the half plane substantially forms the corners of a rectangle when combined with the conjugate points reflected through the origin, the presence of a quasi-periodic two-dimensional object may be indicated.

The output instructions 105 may include instructions to output information about the detection, such as to transmit, store, or display information about the presence of the quasi-periodic two-dimensional object. In one implementation machine-readable storage medium 102 includes additional instructions to determine characteristics of the image of the quasi-periodic two dimensional object if the presence of a quasi-periodic two dimensional object is indicated. For example, the processor may determine the object scale, camera distance, camera focus, object orientation, or other information. In one implementation, the processor may determine characteristics of the of the quasi-periodic object based on the DFT. In some cases, additional properties may be analyzed in addition to the DFT to determine the characteristics. In one implementation, the image is analyzed to determine if sufficient information is provided by the quasi-periodic two-dimensional object for the underlying data associated with the object to be analyzed. For example, if the quality of the image is below a threshold, the processor may determine not to analyze the quasi-periodic two-dimensional object to decode it. In one implementation, information may be displayed or otherwise provided to the user related to the presence of the object and the quality of the capture. The user may then recapture an image for the processor 101 to analyze to determine if the image of the recaptured image is of sufficient quality.

Figure 2A:
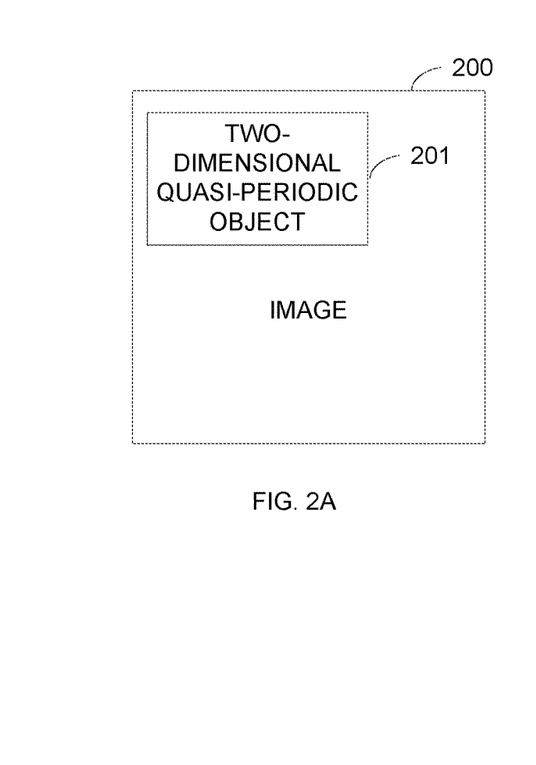
FIG. 2A is a diagram illustrating one example of an image including a quasi-periodic two-dimensional object.

FIG. 2A is a diagram illustrating one example of an image including a quasi-periodic two-dimensional object. For example, image 200 includes a quasi-periodic two-dimensional object 201, such as a steganographic halftone or grid code.

Figure 2B:
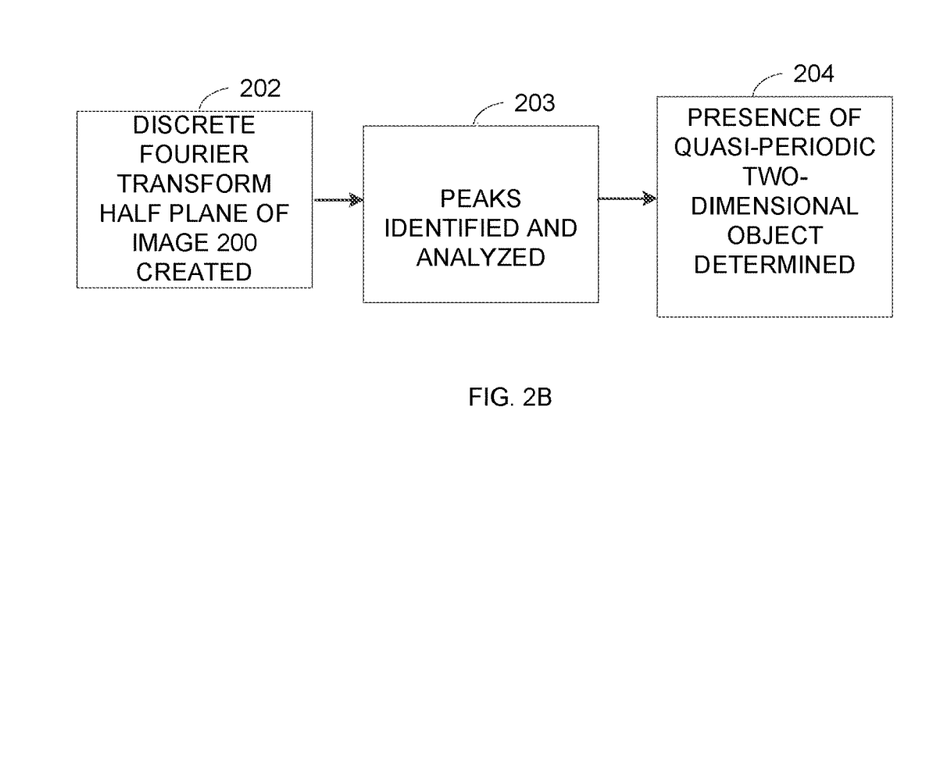
FIG. 2B is a flow chart illustrating one example of a method to detect quasi-periodic two-dimensional object.

FIG. 2B is a flow chart illustrating one example of a method to detect a quasi-periodic two-dimensional object in the image 200. At 202, a processor, such as the processor 101, creates a DFT of the image 200. At 203, the processor identifies and analyzes the peaks within the DFT magnitude image, such as according to their number, value, and/or position. For example, the DFT of image 200 may include two peak points in the half plane due to the presence of the quasi-periodic two-dimensional object 201. At 204, the processor determines that a quasi-periodic two-dimensional object is present in the image 200 based on information about the peak points in the DFT. In one implementation, the processor determines additional information about the image 200 and/or the quasi-periodic two-dimensional object 201 based on the DFT.

Figure 3A:
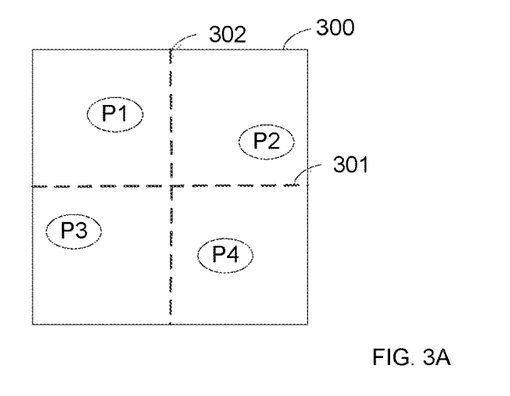
FIG. 3A is a diagram illustrating one example of a Discrete Fourier Transform of an image including a quasi-periodic two-dimensional object.

FIG. 3A is a diagram illustrating one example of a DFT of an image including a quasi-periodic two-dimensional object. For example, DFT 300 is divided into two four quadrants separated by 301 and 302 and includes peak points P1, P2, P3, and P4. The processor may search for peak points in the first half plane created by 301 that includes peak points P1 and P2. The half plane above 301 and below 301 may have the same points reflected through the origin. As an example, the DFT 300 may be of an image including a data bearing halftone such as a stegatone. The stegatone may be a clustered dot halftone image where data is represented by small shifts in the dot clusters. A 45 degree screen threshold array may be used to create a stegatone with the dot clusters arranged in a checkerboard pattern. An image of the stegatone captured with no skew may result in a DFT including frequency spikes representative of corners of a rectangle with the DC term in the center of the DFT. However, there may be some skew/rotation due to the capture method of the image of the stegatone. As another example, the DFT 300 may represent an image containing a grid code. A grid code may include an array of black dots on a white background such that data is encoded based on small perturbations in the dot pattern. The DFT 300 as a whole may show four peak points, two per half plane, where the peak points substantially form the corners of a rectangle around the DC term.

Figure 3B:
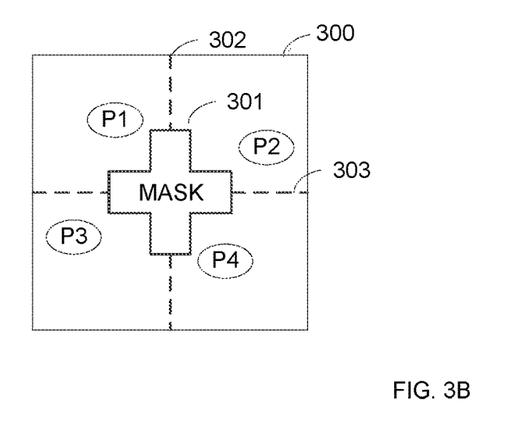
FIG. 3B is a diagram illustrating one example of a Discrete Fourier Transform with a mask to disregard some values of the Discrete Fourier Transform

FIG. 3B is a diagram of the DFT 300 with a mask 303 to disregard some values of the DFT when the processor analyzes the DFT 300 for spikes. The mask may be in any shape, such as in a circle or in the plus sign shape as shown in FIG. 3B. The mask may be placed near the DC term which represents the average spatial domain value of the image, and the values near the DC term may be representative of the lowest frequency content of the image. A plus sign shape similar to mask 303 may be used such that the mask is large enough to not allow leakage of low frequency values and small enough to not hide the sought after peak frequency values.

Figure 3C:
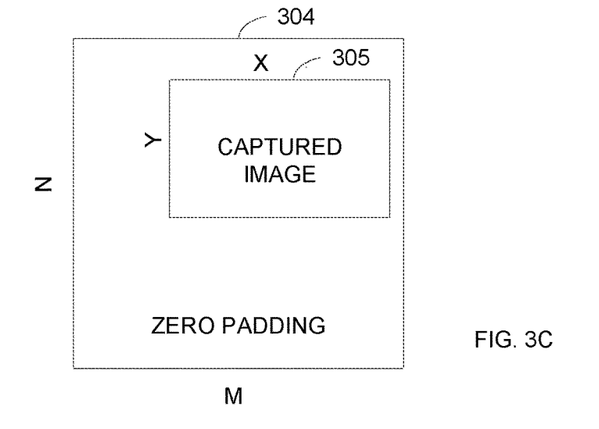
FIG. 3C is a diagram illustrating one example of a Discrete Fourier Transform of an image where padding is added.

FIG. 3C is a diagram illustrating one example of a Discrete Fourier Transform of an image where padding is added. For example, the captured image 305 may be X samples by Y samples and includes a quasi-periodic two-dimensional object and the padded image 304 has a size of M samples by N samples. In some cases, the DFT may be square where N=M. The peak points may be found within the DFT, and the size of the DFT may be taken into account when determining information about the quasi-periodic two-dimensional object.

Figure 4:
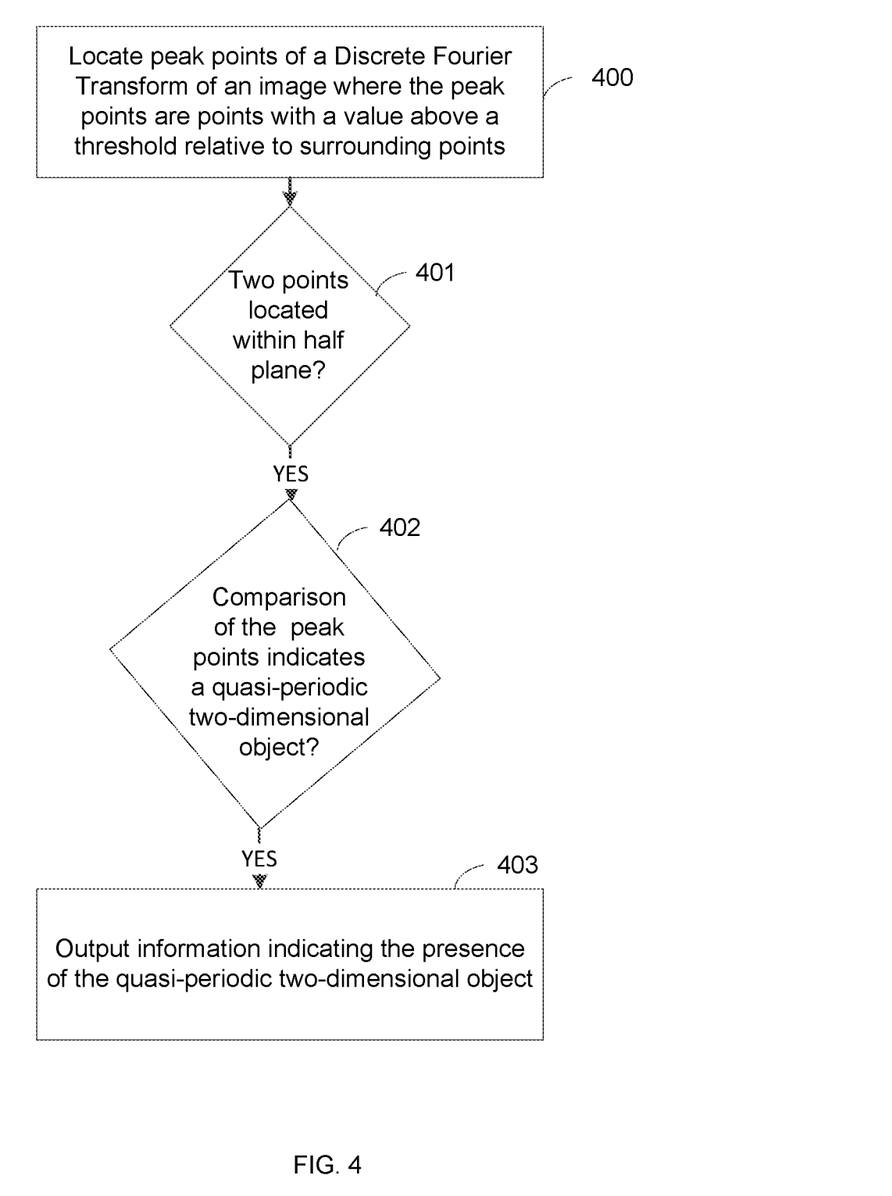
FIG. 4 is a flow chart illustrating one example of a method to detect a quasi-periodic two-dimensional object.

FIG. 4 is a flow chart illustrating one example of a method to detect a quasi-periodic two-dimensional object. The method may be implemented, for example, by the processor 101 of FIG. 1. An image may be captured, such as by a mobile phone, and it may be desirable to determine if the image includes a quasi-periodic two-dimensional object. It may not be evident to a user whether an object in an image is data bearing or non-data-bearing. In addition, the presence and/or position of the object may not be evident because the mark may not include fiducials to outline the position of a data bearing object. A processor may analyze a DFT of an image to determine whether the image includes a quasi-periodic two-dimensional object. The quasi-periodic two-dimensional object may be, for example, a stegatone. The quasi-periodic two-dimensional object may be a halftone structure designed specifically to be detected by the method. The quasi-periodic two-dimensional object may be a grid code. For example, the grid code may include an array of black and white dots with data contained in perturbations in some of the dots.

Beginning at 400, a processor locates peak points in a DFT magnitude of an image where the peak points are points with a value above a threshold relative to surrounding points. The image may be captured in any suitable manner. For example, the image may be captured by a mobile device, such as a mobile phone. The image may be a still image or a video image. In one implementation, a video image is captured with a response from the processor to indicate that the video image should be interpreted to determine the data encoded in the image. In some cases, the image may include a portion of a quasi-periodic two-dimensional object where part of the object is cut off from the image.

A peak point may be a single value within the DFT or a combination of multiple points. The processor may analyze the entire DFT for the peak points or may analyze a half plane of the DFT as the two half planes of the DFT have the same points reflected through the origin. In one implementation, the processor applies a mask to the DFT, such as that shown in FIG. 3B, prior to locating the peak points to disregard or deemphasize some regions prior to searching for the peak points. The peak points may be absolute peak points within the DFT or peak points relative to the surrounding area. In some implementations, the processor looks for the top two peak values. In some implementations, the processor constrains the search for peak points to a bandpass region that excludes ranges of both lower and higher frequencies. Under the assumptions that the image is captured in a manner to allow a specific quasi-periodic structure to be detected, or to allow embedded information to be decoded, it is possible to limit the search for peak points to a subset of possible frequency ranges.

Continuing to 401, the processor determines whether at least two peak points are located within the half plane. For example, in FIG. 3A, the line 301 divides a first half plane and a second half plane. The processor may analyze either half plane. For example, the processor may analyze the half plane above 301 and locate peaks P1 and P2. Peaks P3 and P4 may be inferred due to the relationship of the half planes such that they are the same points reflected through the origin. In this sense P4 will henceforth be referred to as the conjugate of P1, and P3 as the conjugate of P2.

Moving to 402, the processor compares the peak points to determine if they indicate the presence of a two-dimensional quasi-periodic object. The processor may analyze the number, position, and/or value of the peak points to determine if a quasi-periodic two-dimensional object is present within the image. Forming a connecting line between the identified peak points and their conjugate points may create a substantially rectangular shape. For example, in FIG. 3A the relationship of P1 and P2 to the line 301 and/or the relationship of P1, P2, P3, and P4 may be analyzed. The processor may determine whether a rectangular shape would be formed, by connecting line through P1, P2, P3, and P4. The processor may compare the length of two sets of diagonal lines drawn from a first point and the conjugate of the second point to a line from the second point to the conjugate of the first point to determine if the difference between the lengths of the two sets of diagonal lines is below a threshold. The processor may compare of the magnitude of the two peak points in the half plane to determine if a quasi-periodic two-dimensional object exists in cases where the difference in magnitude is above a threshold.

Proceeding to 403, the processor outputs information indicating the presence of the quasi-periodic two-dimensional object. For example, the processor may store, transmit, or display information about the determined presence of the quasi-periodic two-dimensional object. In one implementation, additional information about the quasi-periodic two-dimensional object is determined and output to the user. For example, the quasi-periodic two-dimensional object may be decoded and information about the underlying data provided to a user.

Information about the position of the peak points within the DFT may be output for further processing to determine additional information about the quasi-periodic two-dimensional object and/or information about the image capture of the quasi-periodic two-dimensional object. In one implementation the processor determines a metric related to the object scale, image focus, object orientation, and/or object pixels per cell based on the peak points within the DFT. The image may be captured by a video camera, and the processor may interpret the quasi-periodic two-dimensional object using the captured video after the processor has detected the quasi-periodic two-dimensional object within the video and determined that the video capture has suitable parameters to likely enable proper interpretation. The processor may determine whether to capture a still image of the quasi-periodic two-dimensional object based on the metric, such as where the image quality is determined to be ideal for capturing a decodable image of the quasi-periodic two-dimensional object. Alternatively, the processor may determine that the image data used to compute the DFT is suitable for the intended purposes.

The peak points within the DFT may be used, to determine the scale and orientation of the quasi-periodic two-dimensional object. For example, the horizontal capture samples per cell and the vertical capture samples per cell can be based on information related to the distance between the peak points in the DFT half plane and/or the conjugate peak points.

Figure 5A:
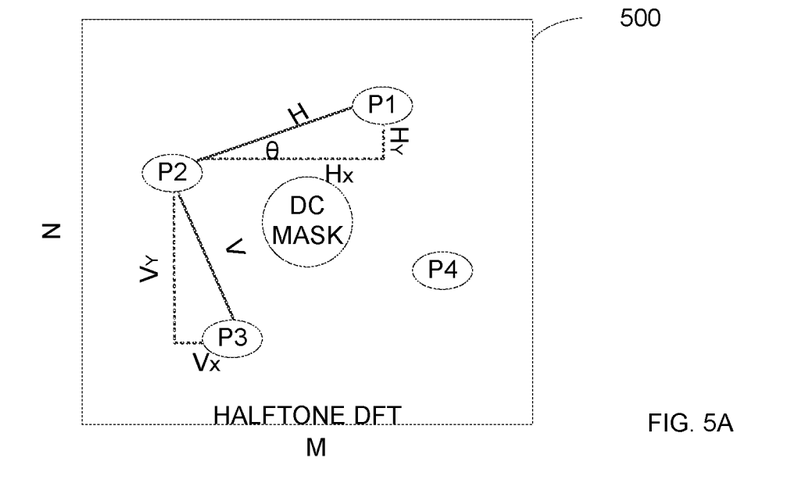
FIG. 5A is a diagram illustrating one example of a Discrete Fourier Transform of an image including a steganographic halftone.

FIG. 5A is an example of a DFT 500 of a steganographic halftone with peak points P1, P2, P3, and P4. There is, a DC mask in the center of the peak points to mitigate the effect of low frequency signals that could interfere with determining the peak points. Peak points P1 and P2 are in a first half plane. Peak point P3 is conjugate of P1 in the second half plane, and peak point P4 is a conjugate of P2 in the second half plane. The length H is the distance from P1 to P2, and the length V is the distance from P1 to P3. The DFT 500 is size N by M. A halftone image includes cells of data, and the scale of a halftone may be determined in terms of samples per cell. A processor may determine the number of horizontal capture samples per cell based on the length between two adjacent peak points of a first dimension of an outline created between the four peak points. A processor may determine the number of vertical capture samples per cell based on the length between two adjacent peak points of a second dimension of an outline created between the four peak points.

The processor may determine the capture samples per cell as the following:

$$\text{Horizontal capture samples per cell} = \frac{1}{\sqrt{\left(\frac{H_x}{M}\right)^2 + \left(\frac{H_y}{N}\right)^2}} = \frac{NM}{\sqrt{N^2 H_x^2 + M^2 H_y^2}}$$

Vertical capture samples per cell =

$$\frac{1}{\sqrt{\left(\frac{V_x}{M}\right)^2 + \left(\frac{V_y}{N}\right)^2}} = \frac{NM}{\sqrt{N^2 V_x^2 + M^2 V_y^2}}$$

In some cases the DFT may be square where N=M, resulting in $$\text{Horizontal capture samples per cell} = \frac{N}{\sqrt{H_x^2 + H_y^2}} = N/H, \text{ and}$$

$$\text{Vertical capture samples per cell} = \frac{N}{\sqrt{V_x^2 + V_y^2}} = N/V.$$

The processor may determine the orientation of the quasi-periodic two-dimensional object based on a comparison of the position of a first of the peak points compared to the position of a second of the peak points, such as by the following:

$$\text{Angle of orientation } \theta = \arctan\left(\frac{H_y/N}{H_x/M}\right)$$

For the case M=N, the angle of orientation determination is simplified to:

Angle of orientation $\theta = \arctan(H_y/H_x)$

Figure 5B:
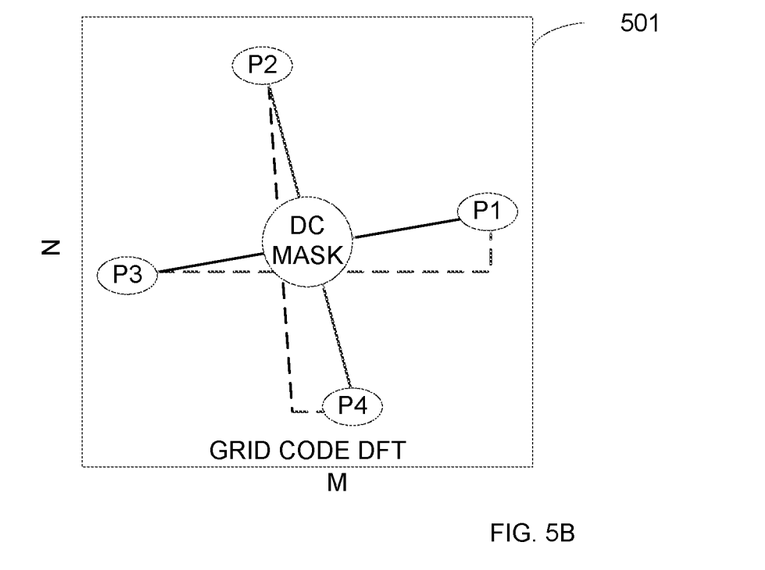
FIG. 5B is a diagram illustrating one example of a Discrete Fourier Transform of an image including a grid code.

The scale and orientation of other types of quasi-periodic two-dimensional objects may be determined based on the position of the peak points within the DFT. For example, the scale and orientation of a grid code object may be determined. FIG. 5B is an example of a DFT 501 of a grid code with peak points P1 and P2 in a first half plane and peak points P3 and P4 as conjugates of P1 and P2 in a second half plane in a DFT 501 with size M by N. A grid code may include data within grid periods, and the scale of the grid code may be determined in terms of samples per grid period. A horizontal line is formed from a first point to the conjugate of the second point, and a vertical line is from a third point to the conjugate of the first point. The processor may determine the horizontal capture samples per cell as the following:

Horizontal samples per grid period =

$$\frac{2}{\sqrt{\left(\frac{H_x}{M}\right)^2 + \left(\frac{H_y}{N}\right)^2}} = \frac{2NM}{\sqrt{N^2 H_x^2 + M^2 H_y^2}}$$

Vertical samples per grid period =

$$\frac{2}{\sqrt{\left(\frac{V_x}{M}\right)^2 + \left(\frac{V_y}{N}\right)^2}} = \frac{2NM}{\sqrt{N^2 V_x^2 + M^2 V_y^2}}$$

If the DFT is size N by N, the processor may determine the scale as horizontal samples per grid period=2N/H and vertical samples per grid period=2N/V.

The orientation of the grid code mark on the image may be determined based on the coordinates of the peak points. For example, the processor may determine:

$$\text{Angle of orientation } \theta = \arctan\left(\frac{H_y/N}{H_x/M}\right)$$

For an N by N DFT, the processor may deter line:

Angle of orientation $\theta = \arctan(H_y/H_x)$

In one implementation, the processor uses the scale information to validate the quasi-periodic two-dimensional object. For example, the processor may determine whether the ratio between the horizontal samples and the vertical samples is below a threshold and determine a quasi-periodic two-dimensional object is not present if the ratio is above the threshold. In one implementation, the processor determines whether the ratio is below a threshold or within a range with respect to a known type of expected quasi-periodic two-dimensional object. For example, the scale may be too large to be in focus or too small to be of sufficient resolution to recover the underlying data. In another implementation, the processor may determine that the horizontal samples and vertical samples are compared with known, acceptable ranges of samples.

In one implementation, the scale and orientation information is used to extract the encoded quasi-periodic two-dimensional object from the image, such as using a multi-scale gradient descent. In some implementations, the processor will determine whether to extract the quasi-periodic two-dimensional object after determining the presence of the object and determining that the parameters indicate that the object is likely to be decoded, such as where the scale is within a particular range.

The invention claimed is:
1. A system, comprising:
a processor to:
capture an image without fiducials, wherein it is unknown whether the image includes a security mark;
create a Discrete Fourier transform (DFT) of the image;
disregard some values of the DFT and then determine points of the DFT of the image with a peak value compared to surrounding values;
determine whether a quasi-periodic two dimensional object exists within the image based on at least one of the number, value, and position of the determined points;
determine whether the image has suitable parameters to enable proper interpretation of the security mark; and
output information of a scale and an orientation related to the determination of whether a quasi periodic two dimensional object exists to decode the security mark.

2. The system of claim 1, wherein determining that a quasi-periodic two dimensional object exists comprises determining that there are two peak points within a half plane of the Discrete Fourier Transform.

3. The system of claim 2, wherein determining that a quasi-periodic two dimensional object exists comprises determining at least one of:
a comparison of the length of a first line drawn from the first peak point to the location of the second peak point reflected through the origin to a line drawn from the second peak point to the location of the first peak reflected through the origin to determine if the difference is below a threshold; and a comparison of the magnitude of the two peak points to determine the difference between the magnitude of the points is below a threshold.

4. The system of claim 1, wherein the processor is further to:
   determine the scale and the orientation of the quasi-periodic two-dimensional object;
   segment the quasi-periodic two-dimensional object from the image based on the scale and orientation; and
   interpret the segmented quasi-periodic two-dimensional object to decode the security mark.

5. The system of claim 1, wherein the processor is further to determine a metric related to at least one of the quasi-periodic two dimensional object scale, quasi-periodic two dimensional object orientation, and quasi-periodic two-dimensional object pixels per cell, based on the peak points in the Discrete Fourier Transform.

6. The system of claim 5, wherein the image is captured by a video camera and wherein the processor is further to determine whether to capture a still image of the quasi-periodic two-dimensional object based on the metric.

7. The system of claim 6, wherein whether to capture a still image further takes into account a focus and a scale of the image.

8. The system of claim 1, wherein the processor is further to constrain a search for the peak value for the points of the DFT to at least one of a subset of possible frequency ranges of the DFT, and a mask to disregard values of the DFT placed near a DC term.

9. A method, comprising:
   capturing an image without fiducials, wherein it is unknown whether the image includes a security mark;
   creating a Discrete Fourier Transform (DFT) of the image;
   disregarding some values of the DFT before locating, by a processor, peak points of the DFT of the image, wherein the peak points are points with a value above a threshold relative to surrounding points;
   if two peak points are located within a half plane of the DFT, comparing the two peak points to determine whether a quasi-periodic two-dimensional object is present within the image;
   determining whether the image has suitable parameters to enable proper interpretation of the security mark; and
   outputting information of a scale and an orientation indicating the presence of the quasi-periodic two-dimensional object to decode the security mark.

10. The method of claim 9, wherein determining whether a quasi-periodic two-dimensional object exists comprises at least one of:
    comparing of the length of a first line drawn from the first peak point to the location of the second peak point reflected through the origin to a line drawn from the second peak point to the location of the first peak reflected through the origin to determine if the difference is below a threshold; and
    comparing of the magnitude of the two peak points to determine whether the difference is above a threshold.

11. The method of claim 9, further comprising determining the scale of the image based on the distance between the peak points and the size of the DFT.

12. The method of claim 9, further comprising determining the orientation of the quasi-periodic two-dimensional object based on a comparison of the position of a first of the peak points compared to the position of a second peak of the peak points at a diagonal position to the first of the peak points.

13. The method of claim 9 wherein disregarding some values of the DFT includes constraining a search for the peak value of the points of the DFT to at least one of a subset of possible frequency ranges of the DFT, and a mask to disregard values of the DFT placed near a DC term.

14. A machine-readable non-transitory storage medium comprising instructions executable by a processor to:
    capture an image without fiducials, wherein it is unknown whether the image includes a security mark;
    create a Discrete Fourier Transform (DFT) of the image;
    disregard some values of the DFT then determine peak points of the DFT of the image, wherein the peak points are points with a value above a threshold relative to surrounding points;
    determine whether a quasi-periodic two dimensional object exists within the image based on at least one of the number, value, and position of the determined points;
    determine whether the image has suitable parameters to enable proper interpretation of the security mark; and
    output information of a scale and an orientation indicating the existence of a quasi-periodic two-dimensional object within the image based on the peak points to decode the security mark.

15. The machine-readable non-transitory storage medium of claim 14, wherein determining the existence of a quasi-periodic two-dimensional object comprises instructions to determine whether the peak points substantially form a rectangle.

16. The machine-readable non-transitory storage medium of claim 14, further comprising instructions to determine the scale of the quasi-periodic two-dimensional object based on the distance between the peak points and the size of the DFT.

17. The machine-readable non-transitory storage medium of claim 16, further comprising instructions to:
    determine the orientation of the quasi-periodic two-dimensional object;
    segment the quasi-periodic two-dimensional object from the image based on the scale and orientation; and
    interpret the segmented quasi-periodic two-dimensional object to decode the security mark.

18. The machine-readable non-transitory storage medium of claim 16, further comprising instructions to determine whether to decode the security mark within the quasi-periodic two-dimensional mark based on the determined scale.

19. The machine-readable non-transitory storage medium of claim 14, further comprising instructions to constrain a search for the peak value for the points of the DFT to at least one of a subset of possible frequency ranges of the DFT, and a mask to disregard values of the DFT placed near a DC term.

20. The machine-readable non-transitory storage medium of claim 14, further comprising instructions to:
    captured by a video camera the image;
    determine whether to capture a still image of the quasi-periodic two-dimensional object based on the metric and taking into account a focus and a scale of the image.

* * * * *

UNITED STATES PATENT AND TRADEMARK OFFICE
CERTIFICATE OF CORRECTION

PATENT NO. : 10,223,800 B2
APPLICATION NO. : 15/300074
DATED : March 5, 2019
INVENTOR(S) : Robert Ulichney et al.

Page 1 of 1

It is certified that error appears in the above-identified patent and that said Letters Patent is hereby corrected as shown below:

In the Claims

In Column 8, Line 41, in Claim 1, delete "transform" and insert -- Transform --, therefor.

In Column 8, Line 52, in Claim 1, delete "quasi periodic" and insert -- quasi-periodic --, therefor.

Signed and Sealed this
Ninth Day of July, 2019

Andrei Iancu
*Director of the United States Patent and Trademark Office*